(12) United States Patent
Shiga et al.

(10) Patent No.: US 11,040,744 B2
(45) Date of Patent: Jun. 22, 2021

(54) SPOILER DEVICE

(71) Applicant: AISIN SEIKI KABUSHIKI KAISHA, Kariya (JP)

(72) Inventors: Tokuhiro Shiga, Kariya (JP); Yukihide Shibutani, Kariya (JP); Hideki Mizuno, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 98 days.

(21) Appl. No.: 16/580,241

(22) Filed: Sep. 24, 2019

(65) Prior Publication Data
US 2020/0094889 A1 Mar. 26, 2020

(30) Foreign Application Priority Data

Sep. 26, 2018 (JP) .............................. JP2018-179819

(51) Int. Cl.
B62D 35/00 (2006.01)
B62D 35/02 (2006.01)

(52) U.S. Cl.
CPC ........... *B62D 35/005* (2013.01); *B62D 35/02* (2013.01); *B60Y 2400/411* (2013.01)

(58) Field of Classification Search
CPC .. B62D 35/005; B62D 35/02; B60Y 2400/411
USPC ..................................................... 296/180.5
See application file for complete search history.

(56) References Cited

U.S. PATENT DOCUMENTS

| 4,904,016 A | * | 2/1990 | Tatsumi | B62D 35/005 |
| | | | | 296/180.5 |
| 2015/0175223 A1 | * | 6/2015 | Jeong | B62D 35/007 |
| | | | | 296/180.5 |
| 2017/0101136 A1 | * | 4/2017 | Zielinski | B62D 35/005 |
| 2017/0120968 A1 | | 5/2017 | Povinelli et al. | |
| 2019/0118872 A1 | | 4/2019 | Shiga et al. | |
| 2019/0152543 A1 | * | 5/2019 | Shiga | B62D 35/005 |
| 2020/0094889 A1 | * | 3/2020 | Shiga | B62D 35/005 |
| 2020/0156715 A1 | * | 5/2020 | Andre | B62D 35/02 |
| 2020/0164934 A1 | * | 5/2020 | Shiga | B62D 35/005 |
| 2020/0189668 A1 | * | 6/2020 | Urbach | B62D 35/005 |
| 2021/0009210 A1 | * | 1/2021 | Matthews | B62D 35/005 |

FOREIGN PATENT DOCUMENTS

| CN | 106536334 | 3/2017 |
| JP | 61-187780 U | 11/1986 |
| JP | 6-227444 | 8/1994 |
| JP | 8-239062 | 9/1996 |

(Continued)

*Primary Examiner* — Gregory A Blankenship
(74) *Attorney, Agent, or Firm* — Finnegan, Henderson, Farabow, Garrett & Dunner, LLP

(57) ABSTRACT

A spoiler device includes a link mechanism and a spoiler member. In the link mechanism, a drive link, an intermediate link, a driven link, and a fixed link are annularly connected. The drive link is driven by an actuator, thereby causing the link mechanism to operate as a four-joint link. The spoiler member is fixed to the intermediate link or the driven link. Any one of the drive link, the intermediate link, and the driven link is configured so as to include, two division links whose one end portions are connected by a connection portion. The two division links are rotatable around the connection portion, and are pressed in rotational directions by a pressing member.

12 Claims, 6 Drawing Sheets

(56) References Cited

FOREIGN PATENT DOCUMENTS

| JP | 8-282550 | 10/1996 |
|----|----------|---------|
| JP | 9-030455 | 2/1997 |
| JP | 2017-226244 | 12/2017 |
| JP | 2019-077303 | 5/2019 |

* cited by examiner

SPOILER DEVICE

CROSS REFERENCE TO RELATED APPLICATIONS

This application is based on and claims priority under 35 U.S.C. § 119 to Japanese Patent Application No. 2018-179819, filed on Sep. 26, 2018, the entire content of which is incorporated herein by reference.

TECHNICAL FIELD

This disclosure generally relates to a movable spoiler device provided at a front portion of a vehicle body.

BACKGROUND DISCUSSION

This type of spoiler device proposed in the prior art is constituted of an arm (intermediate link) fixed to a spoiler body, two links (a drive link and a driven link) connected to the arm, and an actuator that drives one (the drive link) of the links, with at least one of the two links being constituted of a perforated member that is freely and elastically deformable (refer to JP1994-227444A, for example). According to this device, when the spoiler interferes with an obstacle on the ground and external force acts on the spoiler, the link is elastically deformed and thereby absorbs the external force.

In the above-described spoiler device, the link is constituted of the elastically deformable member, and thereby, external force acting on the spoiler member can be absorbed, but a displacement amount of the elastic deformation cannot be made large in the case of taking into consideration that rigidity having a degree so as not to yield to wind pressure is necessary for the link. For this reason, in the spoiler device of the prior art, limitation is imposed on a size of an obstacle a load from which can be released.

A need thus exists for a movable spoiler device which is not susceptible to the drawback mentioned above.

SUMMARY

A spoiler device according to this disclosure is a movable spoiler device provided at a front portion of a vehicle body. The spoiler device includes a link mechanism and a spoiler member. In the link mechanism, a drive link, an intermediate link, a driven link, and a fixed link are annularly connected. The drive link is driven by an actuator, thereby causing the link mechanism to operate as a four-joint link. The spoiler member is fixed to the intermediate link or the driven link, and can be spread out and accommodated relative to the vehicle body by operation of the link mechanism. Any one of the drive link, the intermediate link, and the driven link is configured so as to include two division links whose one end portions are connected by a connection portion. The two division links are rotatable around the connection portion, and are pressed in rotational directions by a pressing member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment for implementing this disclosure is described with reference to the drawings.

Figure 1:
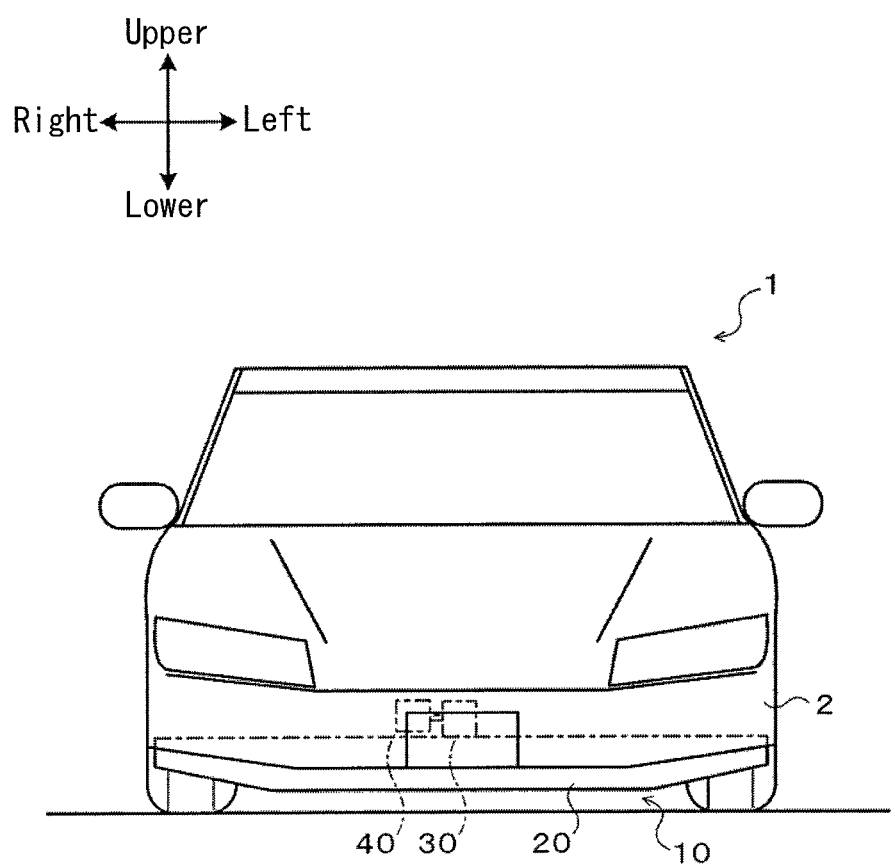
FIG. 1 is a front view of a vehicle 1 including a spoiler device 10 according to this embodiment.
Figure 2:
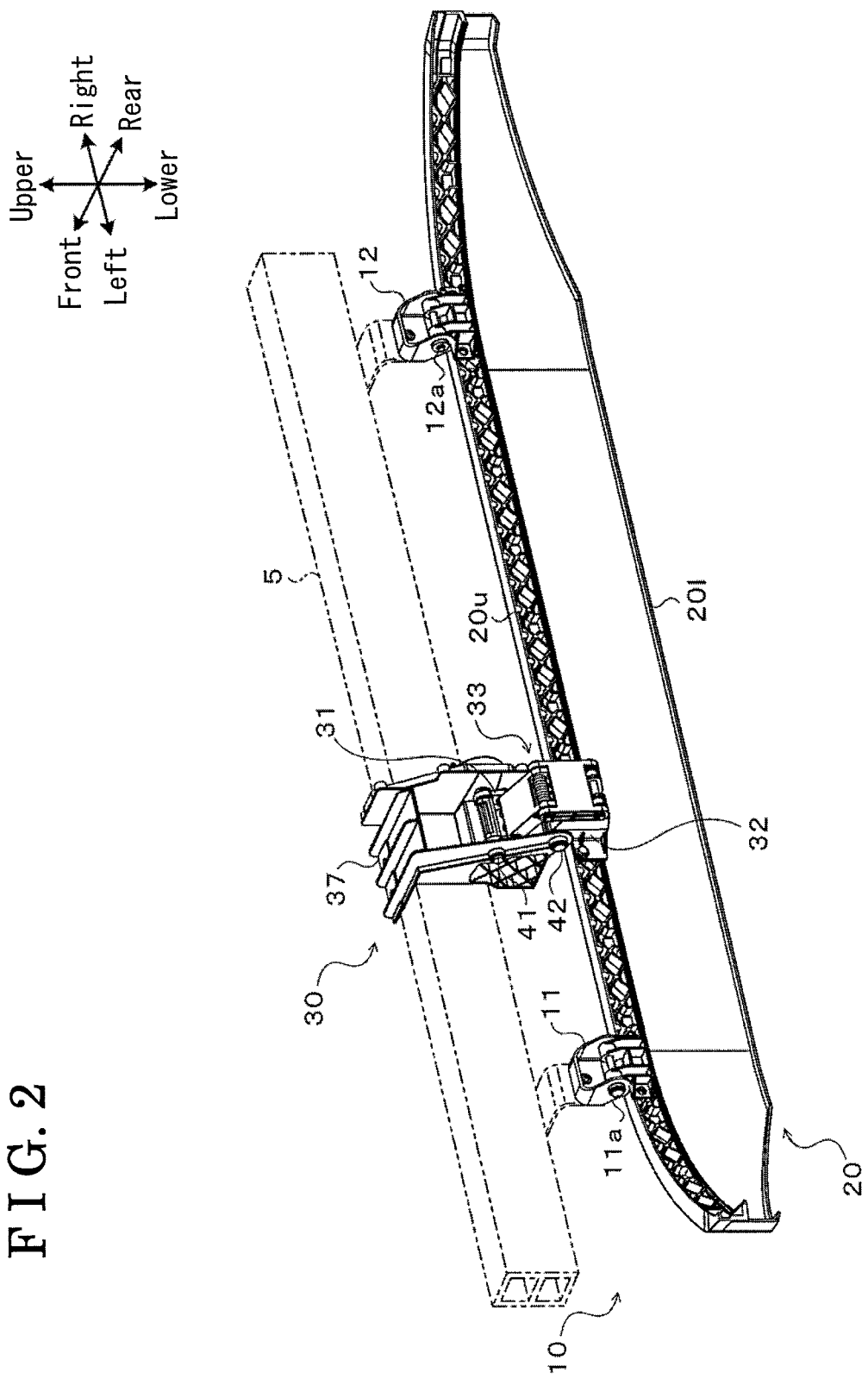
FIG. 2 is an exterior perspective view of the spoiler device 10 when seen from the back side.
Figure 3:
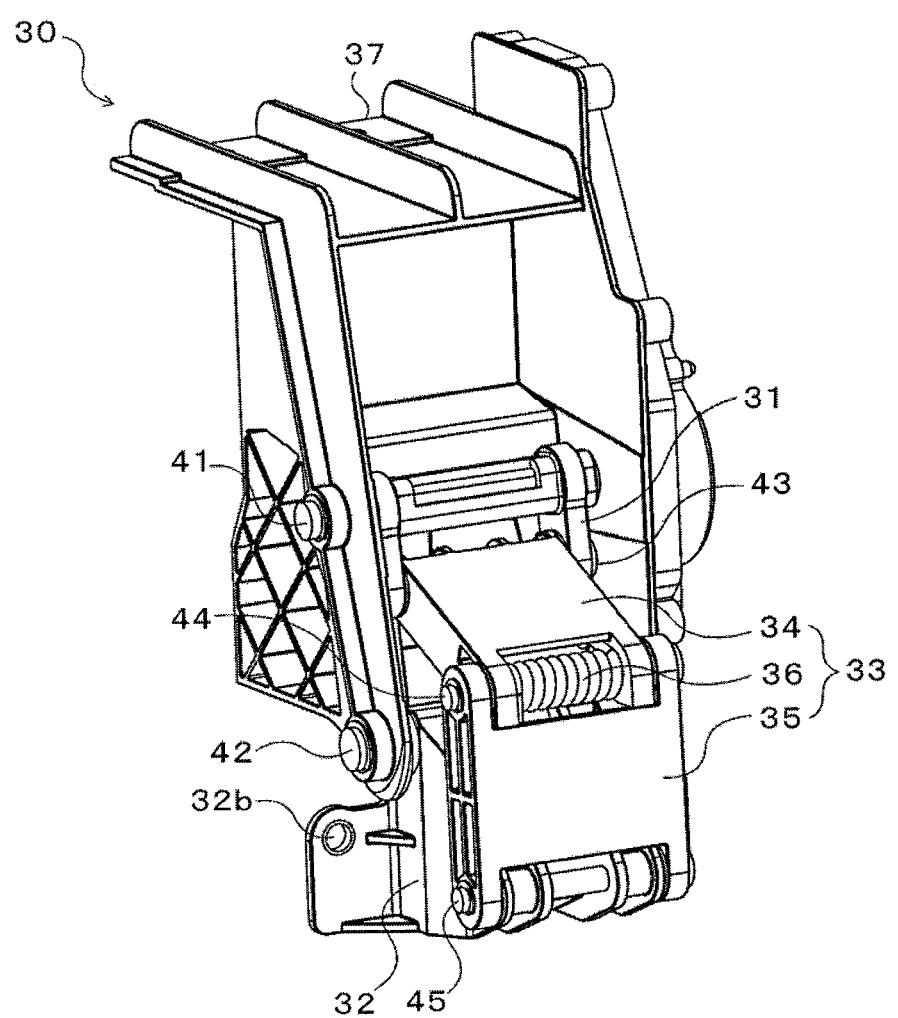
FIG. 3 is an exterior perspective view of a link mechanism 30.

FIG. 1 is a front view of a vehicle 1 including a spoiler device 10 according to this embodiment, FIG. 2 is an exterior perspective view of the spoiler device 10 when seen from the back side, and FIG. 3 is an exterior perspective view of a link mechanism 30. As illustrated in FIG. 1, the spoiler device 10 according to this embodiment is a front spoiler device that can emerge and retract relative to a front bumper 2 provided at a front portion of the vehicle 1, and includes a spoiler member 20 and the link mechanism 30.

The spoiler member 20 is, as illustrated in FIG. 2, a plate-shaped member extending in a vehicle width direction (the left-and-right direction in this figure). Both end portions of the spoiler member 20 in the vehicle width direction are formed in such a way that widths thereof in a vertical direction become narrower toward an outer side in the vehicle width direction. The spoiler member 20 is supported by support members 11 and 12 provided at two left and right positions in an upper end portion 20u of the spoiler member 20. Each of the support members 11 and 12 is fixed to a bumper reinforcement 5, and the upper end portion 20u of the spoiler member 20 is supported by support shafts 11a and 12a provided coaxially with each other at the respective support member 11 and 12, in such a way that the upper end portion 20u is rotatable relative to the bumper reinforcement 5.

The link mechanism 30 includes a drive link 31, a driven link 32, an intermediate link 33, and a bracket 37, and is a mechanism in which with the bracket 37 being a fixed link, the respective links are connected annularly in the order of the drive link 31, the intermediate link 33, the driven link 32, the bracket 37, and the drive link 31. The bracket 37 is fixed to the bumper reinforcement 5, the spoiler member 20 is fixed to the driven link 32, and the drive link 31 is driven by an un-illustrated motor as an actuator whereby the link mechanism 30 causes the spoiler member 20 to emerge and retract relative to the front bumper 2.

At one end of the drive link 31, as illustrated in FIG. 3, a drive shaft 41 is provided so as to be rotatably supported by the bracket 37. A rotational shaft of the motor that can be driven in both forward and backward directions is connected to the drive shaft 41 via a gear mechanism, which is not illustrated. The drive shaft 41 is rotated by the motor, and thereby, the drive link 31 is rotated with the drive shaft 41 functioning as a supporting point.

The driven link 32 is fixed, by a bolt, at a position in the upper end portion 20u of the spoiler member 20 and between the two support members 11 and 12, as illustrated in FIG. 2. As illustrated in FIG. 3, a driven shaft 42 is provided at one end of the driven link 32, being rotatably supported by the bracket 37 and positioned so as to be parallel with and be separated from the drive shaft 41. The driven shaft 42 is provided coaxially with the support shafts 11a and 12a of the support members 11 and 12, and the driven link 32 is rotatable with the driven shaft 42 and the support shafts 11a and 12a functioning as supporting points. Since the spoiler member 20 is fixed to the driven link 32 as described above, the spoiler member 20 rotates accompanying rotation of the driven link 32, with the driven shaft 42 and the support shafts 11a and 12a functioning as the supporting points.

Figure 4:
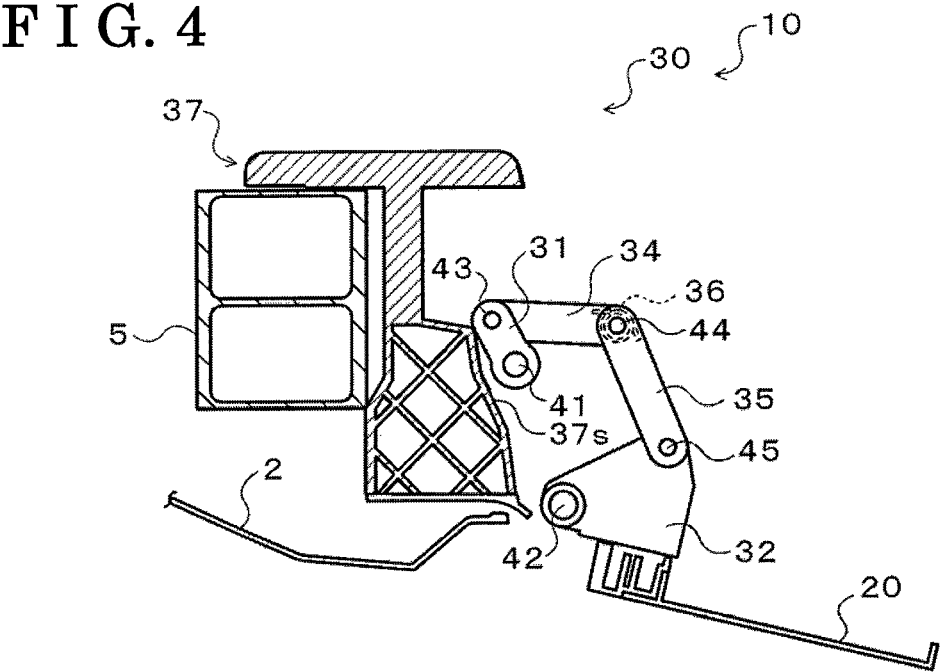
FIG. 4 is a sectional view of the spoiler device 10 at the time of being accommodated.

The bracket 37 functions as a fixed link in the link mechanism 30, and as illustrated in FIG. 3, rotatably supports the drive link 31 via the drive shaft 41, and rotatably supports the driven link 32 via the driven shaft 42 provided at a position parallel with and separated from the drive shaft 41. Further, as illustrated in FIG. 4, the bracket 37 (fixed link) includes a contact surface 37s that faces the intermediate link 33, against which a connection shaft 43 contacts, and that regulates a rotation range of the drive link 31.

The intermediate link 33, as illustrated in FIG. 3, includes a first intermediate link 34 whose one end is rotatably connected to the other end of the drive link 31 via the connection shaft 43, a second intermediate link 35 whose one end is rotatably connected to the other end of the first intermediate link 34 via a connection shaft 44 and whose other end is rotatably connected to the other end of the driven link 32 via a connection shaft 45, and a torsion spring 36 provided at the connecting shaft 44 between the first intermediate link 34 and the second intermediate link 35.

The torsion spring 36 is provided so as to press the first intermediate link 34 and the second intermediate link 35 in directions (opening directions) of increasing an interior angle made by the first intermediate link 34 and the second intermediate link 35 in the annular link mechanism 30, and the first intermediate link 34 and the second intermediate link 35 are held at a predetermined open angle by pressing force of the torsion spring 36. Accordingly, at normal time, the first intermediate link 34 and the second intermediate link 35 move integrally, and the link mechanism 30 functions as a four-joint link by the drive link 31, the intermediate link 33 (the first intermediate link 34 and the second intermediate link 35), the driven link 32, and the bracket 37 (fixed link).

Next, description is made on operation of the thus-configured spoiler device 10 according to this embodiment. When the vehicle 1 is stopped, or is running at a low speed, the spoiler device 10 according to this embodiment is in an accommodated state of being accommodated in the front bumper 2 when seen from the front of the vehicle 1, and at the time of high speed running, the spoiler device 10 is in a spread-out state of being spread out from the front bumper 2. In the accommodated state, as illustrated in FIG. 4, the drive link 31 is rotated counterclockwise in the drawing, and the spoiler member 20 is held in a state of being inclined toward a rear of the vehicle 1.

Figure 5:
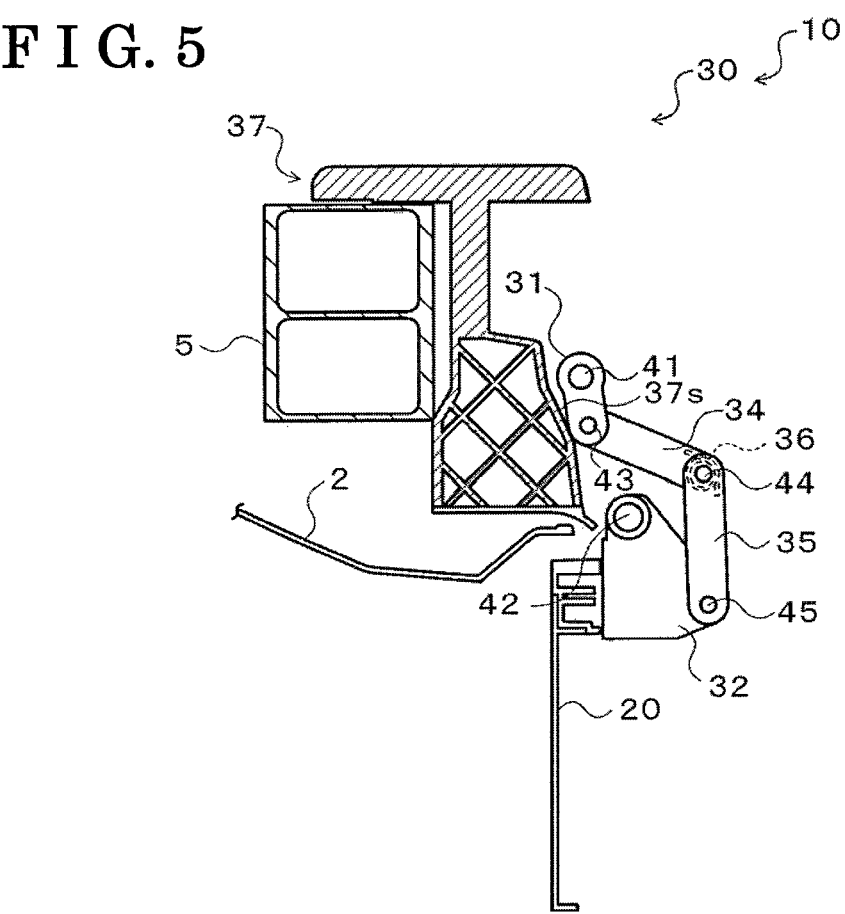
FIG. 5 is a sectional view of the spoiler device 10 at the time of being spread out.

In the spread-out state, as illustrated in FIG. 5, the drive link 31 is rotated clockwise in the drawing, and accompanying this, the first intermediate link 34 and the second intermediate link 35 integrally move, and rotate the driven link 32 clockwise in the drawing, and thereby, the spoiler member 20 is brought into a posture of being vertical to a lower side of the vehicle 1. In the spread-out state, the link mechanism 30 is in what is called a turned-over state where an interior angle of the connection shaft 43 made by the drive link 31 and the first intermediate link 34 changes from an angle smaller than 180 degrees to an angle larger than 180 degrees, and the connection shaft 43 between the drive link 31 and the first intermediate link 34 contacts against the contact surface 37s of the bracket 37.

Figure 6:
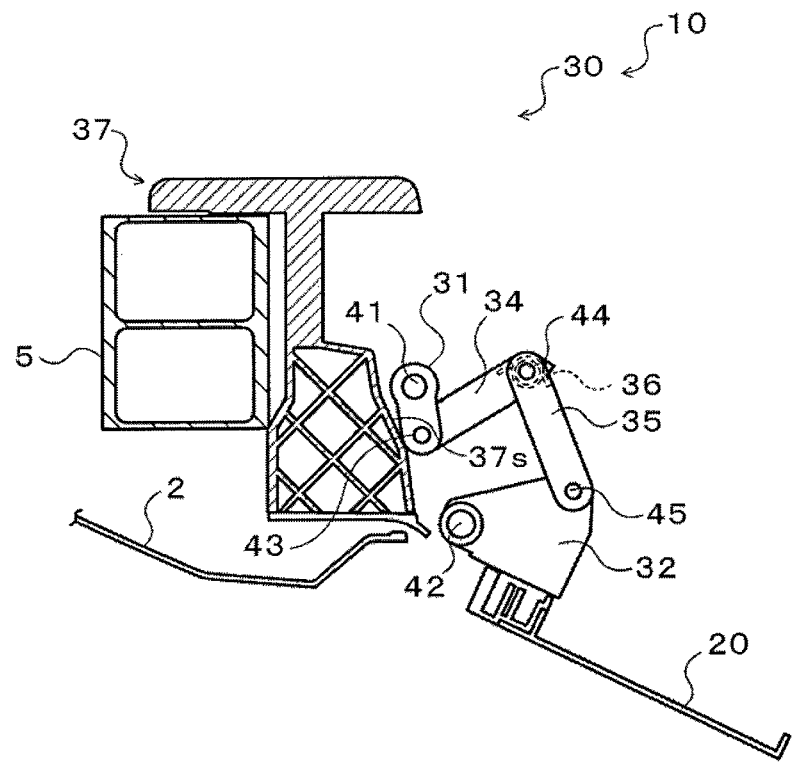
FIG. 6 is a sectional view of the spoiler device 10 at the time of interference.

As illustrated in FIG. 6, when external force directed from the front to the rear of the vehicle 1 acts on the spoiler member 20 due to interference of an obstacle or the like during running in the spread-out state, the first intermediate link 34 and the second intermediate link 35 are rotated, against the pressing force of the torsion spring 36 provided at the connection shaft 44, in directions of decreasing an interior angle made by the first intermediate link 34 and the second intermediate link 35. Thereby, the elastic force of the torsion spring 36 absorbs the external force acting on the spoiler member 20, and thus, the first intermediate link 34, the second intermediate link 35, and the driven link 32 can be prevented from being damaged. Further, in the spread-out state, the connection shaft 43 between the drive link 31 and the first intermediate link 34 contacts against the contact surface 37s of the bracket 37 in the turned-over state, and for this reason, the external force acting on the spoiler member 20 is not transmitted to the drive link 31, i.e., the actuator.

The above-described spoiler device 10 according to this embodiment includes the link mechanism 30 in which the drive link 31, the intermediate link 33, the driven link 32, and the bracket 37 (fixed link) are connected annularly and that operates as the four-joint link by drive of the drive link 31, and the spoiler member 20 fixed to the driven link 32. The intermediate link 33 is constituted of the first intermediate link 34 and the second intermediate link 35 connected to each other by the connection shaft 44. The first intermediate link 34 and the second intermediate link 35 are rotatable relative to each other around the connection shaft 44, and are pressed in the rotational directions by the torsion spring 36. Thereby, even when external force acts on the spoiler member 20 due to interference with an obstacle, or the like, the first intermediate link 34 and the second intermediate link 35 rotate against the pressing force of the torsion spring 36 whereby the external force is absorbed. As a result, the movable spoiler device 10 can favorably absorb the external force acting on the spoiler member 20.

Further, in the state where the spoiler member 20 is spread out, the link mechanism 30 is in the turned-over state where an interior angle of the connection shaft 43 made by the drive link 31 and the first intermediate link 34 is larger than 180 degrees, and the connection shaft 43 contacts against the contact surface 37s of the bracket 37, and thus, external force acting on the spoiler member 20 can be prevented from being transmitted to the drive link 31, i.e. the actuator, and the actuator can be more reliably prevented from being damaged. Naturally, the external force acting on the spoiler member 20 is absorbed by elastic force of the torsion spring 36, and thus, each of the links can be prevented from being damaged.

Although the intermediate link 33 is constituted of the division links (the first intermediate link 34 and the second intermediate link 35) in the above-described embodiment, the drive link 31 may be constituted of division links, or the driven link 32 may be constituted of division links.

Figure 7:
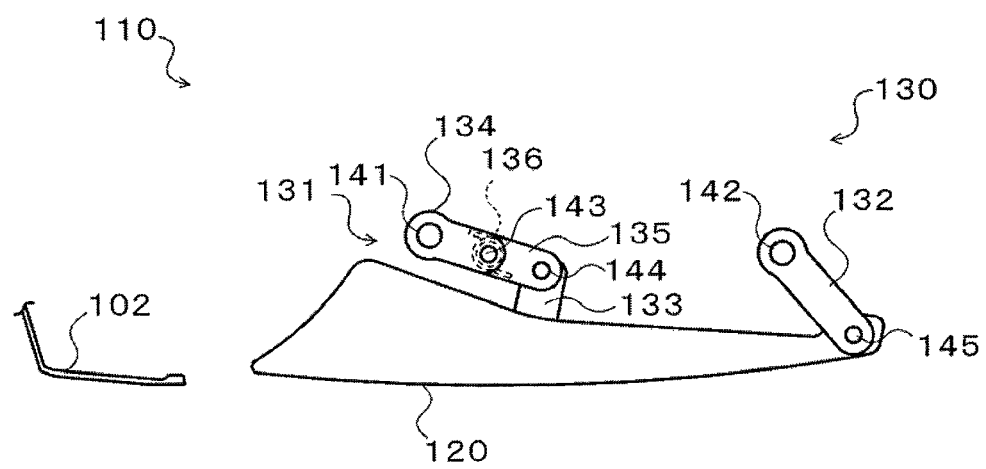
FIG. 7 is a side view of a spoiler device 110 according to a modified example, at the time of being accommodated.

The spoiler member 20 is fixed to the driven link 32 in the above-described embodiment, but may be fixed to an intermediate link. FIG. 7 is a side view of a spoiler device 110 according to a modified example. In FIG. 7, illustration of a fixed link is omitted. As illustrated in the drawing, the spoiler device 110 according to the modified example includes a spoiler member 120 and a link mechanism 130.

Figure 8:
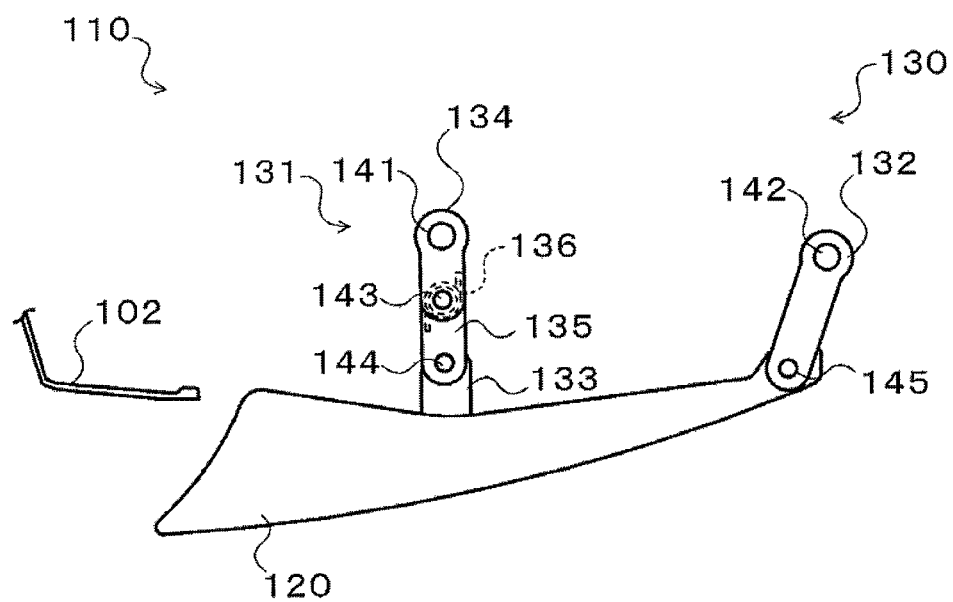
FIG. 8 is a side view of the spoiler device 110 according to the modified example, at the time of being spread out.
Figure 9:
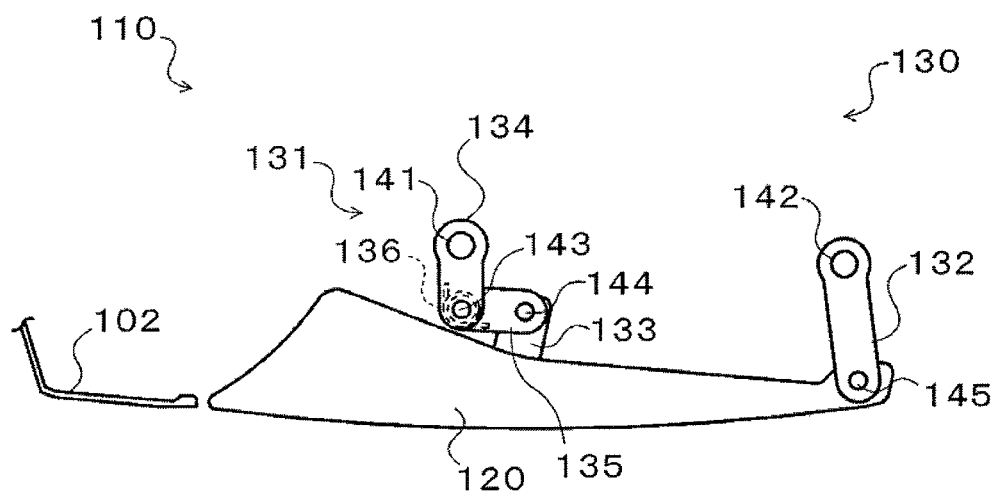
FIG. 9 is a side view of the spoiler device 110 according to the modified example, at the time of interference.

The link mechanism 130 includes a drive link 131 driven by an un-illustrated actuator, an intermediate link 133, a driven link 132, and the fixed link that are connected annularly, with the fixed link rotatably supporting a drive shaft 141 of the drive link 131 and a driven shaft 142 of the driven link 132 so as to be in parallel with each other and be at positions separated from each other. The drive link 131 includes a first drive link 134 with one end where the drive shaft 141 is provided, a second drive link 135 whose one end is rotatably connected to the other end of the first drive link 134 via a connection shaft 143 and whose other end is connected to the intermediate link 133, and a torsion spring 136 provided at the connection shaft 143. The torsion spring 136 is provided so as to press the first drive link 134 and the second drive link 135 in directions of increasing an interior angle made by the first drive link 134 and the second drive link 135 in the annular link mechanism 130. In the thus-configured spoiler device 110 according to the modified example, as illustrated in FIG. 7, when the first drive link 134 is rotated counterclockwise in the drawing, the second drive link 135 is rotated integrally with the first drive link 134, and accompanying this, the spoiler member 120 is brought into an accommodated state of being accommodated in a front bumper 102 when seen from a front of a vehicle. Meanwhile, when the first drive link 134 is rotated clockwise in the drawing, the second drive link 135 is rotated integrally with the first drive link 134, and accompanying this, the spoiler member 120 fixed to the intermediate link 133 is brought into a spread-out state of being spread out from the front bumper 102 to a lower side. Further, in the spread-out state, when external force acts on the spoiler member 120 by interference of an obstacle or the like, as illustrated in FIG. 8, the first drive link 134 and the second drive link 135 are rotated, against pressing force of the torsion spring 136 provided at the connection shaft 143, in directions of decreasing an interior angle made by the first drive link 134 and the second drive link 135. Thereby, the external force is absorbed by elastic force of the torsion spring 136, and the actuator and the link mechanism 130 can be prevented from being damaged. Note that the drive link 131 is constituted of the division links (the first drive link 134 and the second drive link 135) in the above-described modified example, but the driven link 132 may be constituted of division links, or the intermediate link 133 may be constituted of division links.

Although the two division links (the first intermediate link 34 and the second intermediate link 35) that are connected to each other by the connection shaft 44 so as to be rotatable relative to each other and that are pressed in the rotational directions by the torsion spring 36 are provided in the above-described embodiment and the modified example thereof, three or more division links may be provided.

The following description is made on correspondence relation between main elements of the above-described embodiment and main elements of the disclosure described in SUMMARY and below. In the embodiment, the drive link 31 corresponds to "the drive link", the intermediate link 33 corresponds to "the intermediate link", the driven link 32 corresponds to "the driven link", the bracket 37 corresponds to "the fixed link", the link mechanism 30 corresponds to "the link mechanism", the spoiler member 20 corresponds to "the spoiler member", the first intermediate link 34 and the second intermediate link 35 correspond to "the two division links", and the torsion spring 36 corresponds to "the pressing member". The bracket 37 further corresponds to the "the stationary member". The support members 11 and 12 correspond to "the support members".

Note that the correspondence relation between the main elements of the above-described embodiment and the main elements of the disclosure is merely one example for specifically describing the form for implementing the disclosure, and for this reason, does not limit the elements of the disclosure. In other words, the disclosure is interpreted on the basis of the description made below, and the embodiment is merely one specific example of the disclosure.

A spoiler device according to this disclosure is a movable spoiler device provided at a front portion of a vehicle body. The spoiler device includes a link mechanism and a spoiler member. In the link mechanism, a drive link, an intermediate link, a driven link, and a fixed link are annularly connected. The drive link is driven by an actuator, thereby causing the link mechanism to operate as a four-joint link. The spoiler member is fixed to the intermediate link or the driven link, and can be spread out and accommodated relative to the vehicle body by operation of the link mechanism. Any one of the drive link, the intermediate link, and the driven link is configured so as to include two division links whose one end portions are connected by a connection portion. The two division links are rotatable around the connection portion, and are pressed in rotational directions by a pressing member.

The spoiler device according to this disclosure includes the link mechanism and the spoiler member. In the link mechanism, the drive link, the intermediate link, the driven link, and the fixed link are annularly connected. The drive link is driven, thereby causing the link mechanism to operate as the four-joint link. The spoiler member is fixed to the intermediate link or the driven link. In the spoiler device, any one of the drive link, the intermediate link, and the driven link is configured so as to include two division links connected to each other, and the two division links are configured so as to be rotatable around the connection portion, and be pressed in rotational directions by the pressing member. Thereby, even when external force acts on the spoiler member due to interference with an obstacle, or the like, the two division links rotate relative to each other against pressing force of the pressing member whereby the external force is absorbed. As a result, by a sufficient displacement amount, the movable spoiler device can favorably absorb the external force acting on the spoiler member.

In such a spoiler device according to the disclosure, the link mechanism may be configured in such a way that, when the spoiler member is accommodated, an interior angle of the connection portion made by the drive link and the intermediate link becomes smaller than 180 degrees, and when the spoiler member is spread out, an interior angle of the connection portion made by the drive link and the intermediate link becomes larger than 180 degrees, and the connection portion contacts against a stationary member. The two division links may be included in the intermediate link or the driven link. Thereby, external force acting on the spoiler member is not transmitted to the actuator, and thus, the actuator is prevented from being damaged due to the external force. Further, since the two division links included in the intermediate link or the driven link rotate against pressing force of the pressing member and thereby absorbs the external force acting on the spoiler member, the intermediate link and the driven link also can be prevented from being damaged. In the spoiler device according to this aspect of this disclosure, the spoiler member may be fixed to the driven link, and the two division links may be included in the intermediate link.

Further, in the spoiler device according to this disclosure, the two division links may be included in one link closer to the drive link than a different link to which the spoiler member is fixed, in which the one link and the different link may be among the drive link, the intermediate link, and the driven link. The two division links are arranged on a route between the actuator and the spoiler member whereby external force acting on the spoiler member can be prevented from being transmitted directly to the actuator.

Furthermore, the spoiler device according to this disclosure may include a support member that is on each side of the link mechanism in a vehicle width direction and that supports the spoiler member so as to be rotatable relative to the vehicle body. A rotational shaft of the support member may be provided coaxially with a rotational shaft of the driven link that rotates relative to the fixed link. Thereby, the spoiler member can be more stably supported in a rotatable state.

The embodiment of this disclosure is described above, but needless to say, this disclosure is not limited to the embodiment at all, and can be implemented in various forms within the scope that does not depart from the essence of this disclosure.

This disclosure is applicable to the industry of manufacturing a spoiler device, and the like.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A movable spoiler device provided at a front portion of a vehicle body, the spoiler device comprising:
   a link mechanism in which a drive link, an intermediate link, a driven link, and a fixed link are annularly connected, and that operates as a four-joint link by drive of the drive link by an actuator; and
   a spoiler member that is fixed to the intermediate link or the driven link, and that can be spread out and accommodated relative to the vehicle body by operation of the link mechanism, wherein
   any one of the drive link, the intermediate link, and the driven link is configured so as to include two division links whose one end portions are connected by a connection portion, and
   the two division links are rotatable around the connection portion, and are pressed in rotational directions by a pressing member.

2. The spoiler device according to claim 1, wherein
   the link mechanism is configured in such a way that, when the spoiler member is accommodated, an interior angle of a connection portion made by the drive link and the intermediate link becomes smaller than 180 degrees, and when the spoiler member is spread out, an interior angle of a connection portion made by the drive link and the intermediate link becomes larger than 180 degrees, and the connection portion contacts against a stationary member, and the two division links are included in the intermediate link or the driven link.

3. The spoiler device according to claim 2, wherein
   the spoiler member is fixed to the driven link, and the two division links are included in the intermediate link.

4. The spoiler device according to claim 1, wherein
   the two division links are included in one link closer to the drive link than a different link to which the spoiler member is fixed, in which the one link and the different link are among the drive link, the intermediate link, and the driven link.

5. The spoiler device according to claim 2, wherein
   the two division links are included in one link closer to the drive link than a different link to which the spoiler member is fixed, in which the one link and the different link are among the drive link, the intermediate link, and the driven link.

6. The spoiler device according to claim 3, wherein
   the two division links are included in one link closer to the drive link than a different link to which the spoiler member is fixed, in which the one link and the different link are among the drive link, the intermediate link, and the driven link.

7. The spoiler device according to claim 1, further comprising
   a support member that is on each side of the link mechanism in a vehicle width direction and that supports the spoiler member so as to be rotatable relative to the vehicle body, wherein
   a rotational shaft of the support member is provided coaxially with a rotational shaft of the driven link that rotates relative to the fixed link.

8. The spoiler device according to claim 2, further comprising a support member that is on each side of the link mechanism in a vehicle width direction and that supports the spoiler member so as to be rotatable relative to the vehicle body, wherein
   a rotational shaft of the support member is provided coaxially with a rotational shaft of the driven link that rotates relative to the fixed link.

9. The spoiler device according to claim 3, further comprising a support member that is on each side of the link mechanism in a vehicle width direction and that supports the spoiler member so as to be rotatable relative to the vehicle body, wherein
   a rotational shaft of the support member is provided coaxially with a rotational shaft of the driven link that rotates relative to the fixed link.

10. The spoiler device according to claim 4, further comprising a support member that is on each side of the link mechanism in a vehicle width direction and that supports the spoiler member so as to be rotatable relative to the vehicle body, wherein
    a rotational shaft of the support member is provided coaxially with a rotational shaft of the driven link that rotates relative to the fixed link.

11. The spoiler device according to claim 5, further comprising a support member that is on each side of the link mechanism in a vehicle width direction and that supports the spoiler member so as to be rotatable relative to the vehicle body, wherein
    a rotational shaft of the support member is provided coaxially with a rotational shaft of the driven link that rotates relative to the fixed link.

12. The spoiler device according to claim 6, further comprising a support member that is on each side of the link mechanism in a vehicle width direction and that supports the spoiler member so as to be rotatable relative to the vehicle body, wherein a rotational shaft of the support member is provided coaxially with a rotational shaft of the driven link that rotates relative to the fixed link.

\* \* \* \* \*